US012381329B2

(12) United States Patent
Wu et al.

(10) Patent No.: US 12,381,329 B2
(45) Date of Patent: Aug. 5, 2025

(54) INTEGRATED PROCESSOR AND ANTENNA SYSTEM FOR A TRANSPORTATION VEHICLE

(71) Applicant: Panasonic Avionics Corporation, Irvine, CA (US)

(72) Inventors: Vic Wu, Lake Forest, CA (US); Shrenik Shah, Lake Forest, CA (US); Larry Nguyen, Lake Forest, CA (US); Shane Lee, Lake Forest, CA (US); Hamabe Taichi, Osaka (JP); Gary Chen, Lake Forest, CA (US); Edwin Vasquez, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 248 days.

(21) Appl. No.: 17/900,700

(22) Filed: Aug. 31, 2022

(65) Prior Publication Data

US 2024/0072450 A1 Feb. 29, 2024

(51) Int. Cl.
*H01Q 1/32* (2006.01)
*H01Q 9/28* (2006.01)

(52) U.S. Cl.
CPC ............... *H01Q 9/285* (2013.01); *H01Q 1/32* (2013.01)

(58) Field of Classification Search
CPC H01Q 9/285; H01Q 1/32; H01Q 1/27; H01Q 1/3208; H01Q 1/2291
See application file for complete search history.

(56) References Cited

U.S. PATENT DOCUMENTS

| | | | | |
|---|---|---|---|---|
| 10,003,125 | B2 * | 6/2018 | Yoon | H01Q 1/48 |
| 10,305,171 | B1 * | 5/2019 | Navarro | H01Q 5/307 |
| 2009/0073074 | A1 * | 3/2009 | Chang | H01Q 9/0428 343/846 |
| 2014/0242903 | A1 * | 8/2014 | DeLuis | H01Q 1/521 343/893 |
| 2016/0049736 | A1 * | 2/2016 | Liu | H01Q 21/28 343/893 |
| 2018/0255491 | A1 * | 9/2018 | Rabii | H04W 36/08 |
| 2020/0303807 | A1 * | 9/2020 | Caratelli | H01Q 1/48 |
| 2020/0359462 | A1 * | 11/2020 | Zimmerman, III | H01Q 1/246 |
| 2022/0346289 | A1 * | 10/2022 | Sagar | H01Q 1/246 |
| 2023/0042885 | A1 * | 2/2023 | Wu | H01Q 1/2291 |
| 2023/0104167 | A1 * | 4/2023 | Nghiem | H01Q 19/108 455/575.7 |

* cited by examiner

*Primary Examiner* — Dameon E Levi
*Assistant Examiner* — Michael M Bouizza
(74) *Attorney, Agent, or Firm* — LOZA & LOZA, LLP

(57) ABSTRACT

One or more Wireless Access Points (WAPs) are provided for a transportation vehicle. One WAP includes a combined board having a first area with micro-processor components and a second area with antenna elements, the second area located at a periphery of the combined board; a metallic cover placed over the first area; and a non-metallic cover placed over the metallic cover and the second area.

17 Claims, 10 Drawing Sheets

INTEGRATED PROCESSOR AND ANTENNA SYSTEM FOR A TRANSPORTATION VEHICLE

TECHNICAL FIELD

The present disclosure relates to transportation vehicles in general, and more particularly, to using an integrated micro-processor and antenna board for a wireless access point on aircrafts and other transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

An aircraft (and other vehicles) typically provides one or more Wireless Access Point (WAP) (also referred to as Cabin Wireless Access Point (CWAP) interchangeably throughout this specification) that enables network connectivity for IFE and other devices. Conventional WAPs use three boards, a power supply board, a micro-processor board, and an antenna board. The power supply board and the micro-processor board are contained within a metal box to prevent and limit electromagnetic interference to the antenna board components. The antenna board is structurally located outside the metal box because the metal box is not permeable to any wavelengths received and transmitted by the antenna board. Typically, each antenna board has a "tall module" which is typically covered by a permeable plastic cover. The plastic cover is placed on top of the metal box.

The conventional design has limitations, e.g., the antenna board placed outside the metal box increases the height of the overall structure, which must meet stringent height requirements on an aircraft. Furthermore, the micro-processor board and the antenna board are connected by physical cables and the connectors through the metal, which makes the design complex and vulnerable to cable related damage. Separate antenna and micro-processor boards also increase the overall weight of the WAP that again must meet strict aircraft weight restrictions. Continuous efforts are being made to develop a better WAP micro-processor and antenna board design.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, an innovative wireless access point (WAP) configuration is provided. Instead of using separate antenna and micro-processor boards, a combined board is used. The combined board has a first area with micro-processor components and a second area with antenna elements, the second area located at a periphery of the combined board. A metallic cover is placed over the first area, while a non-metallic cover is placed over the metallic cover and the second area. The combined board reduces weight, height and complexity of WAP design, as described below in detail.

Figure 1A:
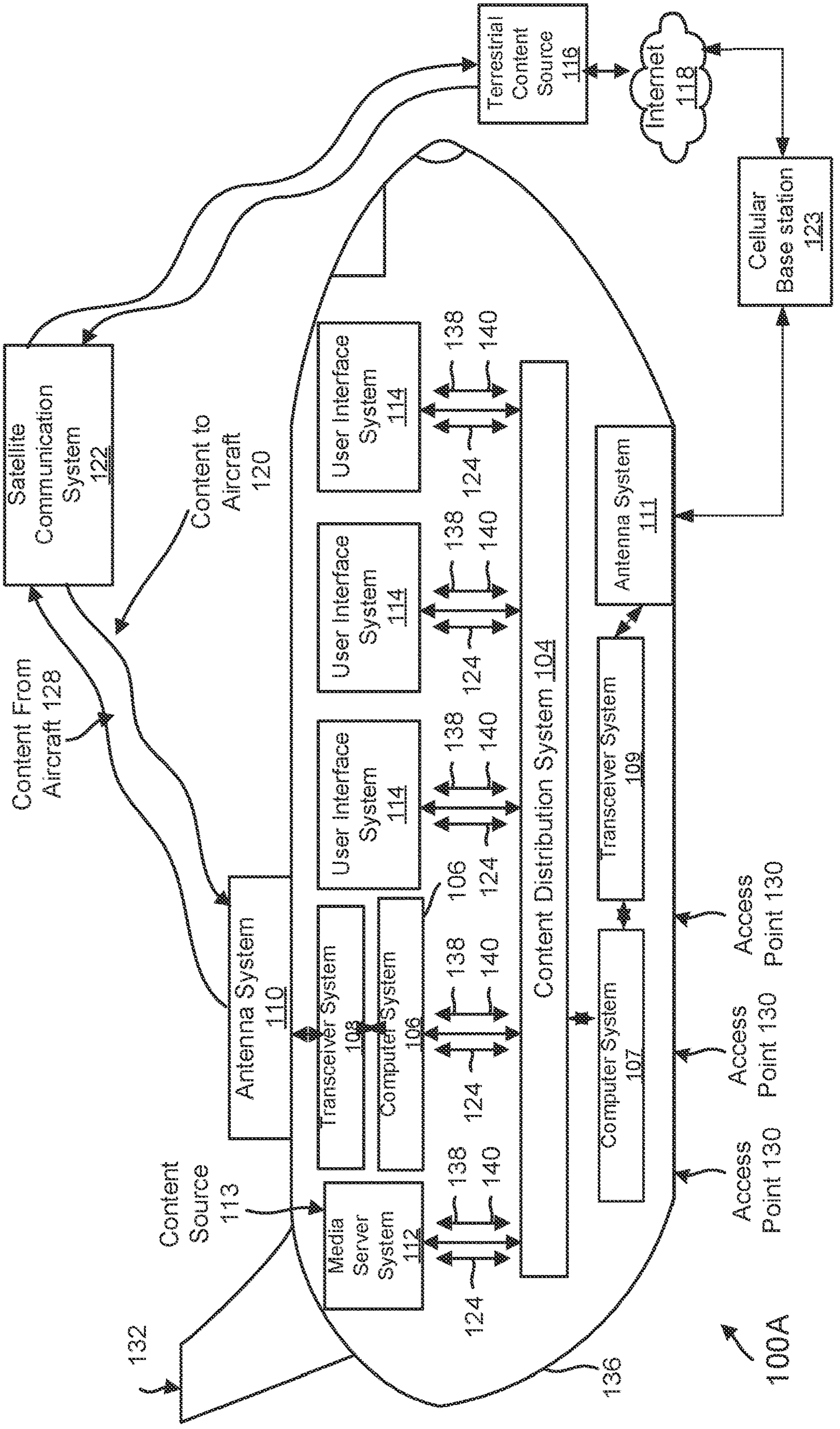
FIG. 1A shows an example of an operating environment for implementing the various aspects of the present disclosure on an aircraft.

Vehicle Information System: Before describing the details of the WAP design, a description of the overall operating environment will be helpful. FIG. 1A shows an example of a generic vehicle information system 100A (also referred to as system 100A) that can be configured for installation aboard an aircraft 132, according to various aspects of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

System 100A comprises at least one content source 113 and one or more user (or passenger) interface systems (may also be referred to as a seat device/seatback device/smart monitor) 114 that communicate with a real-time content distribution system 104. The content sources 113 may include one or more internal content sources, such as a media server system 112, that are installed aboard the aircraft 132, one or more remote (or terrestrial) content sources 116 (including OTT content providers) that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including storage class memory, optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or the cellular base station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130 (also referred to as a cabin wireless access point (CWAP) or wireless access point (WAP) 130 for enabling wireless connectivity. The user interface system 114 provides a display device to view content. The user interface system 114 includes a hardware interface to connect to a WAP 130 that provides a wired and/or a wireless connection for the user interface system.

In at least one embodiment, the user interface system 114 comprises a software application that a user downloads and installs on a personal electronic device to receive and view content via a WAP 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system for permitting the user (or also referred to as passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
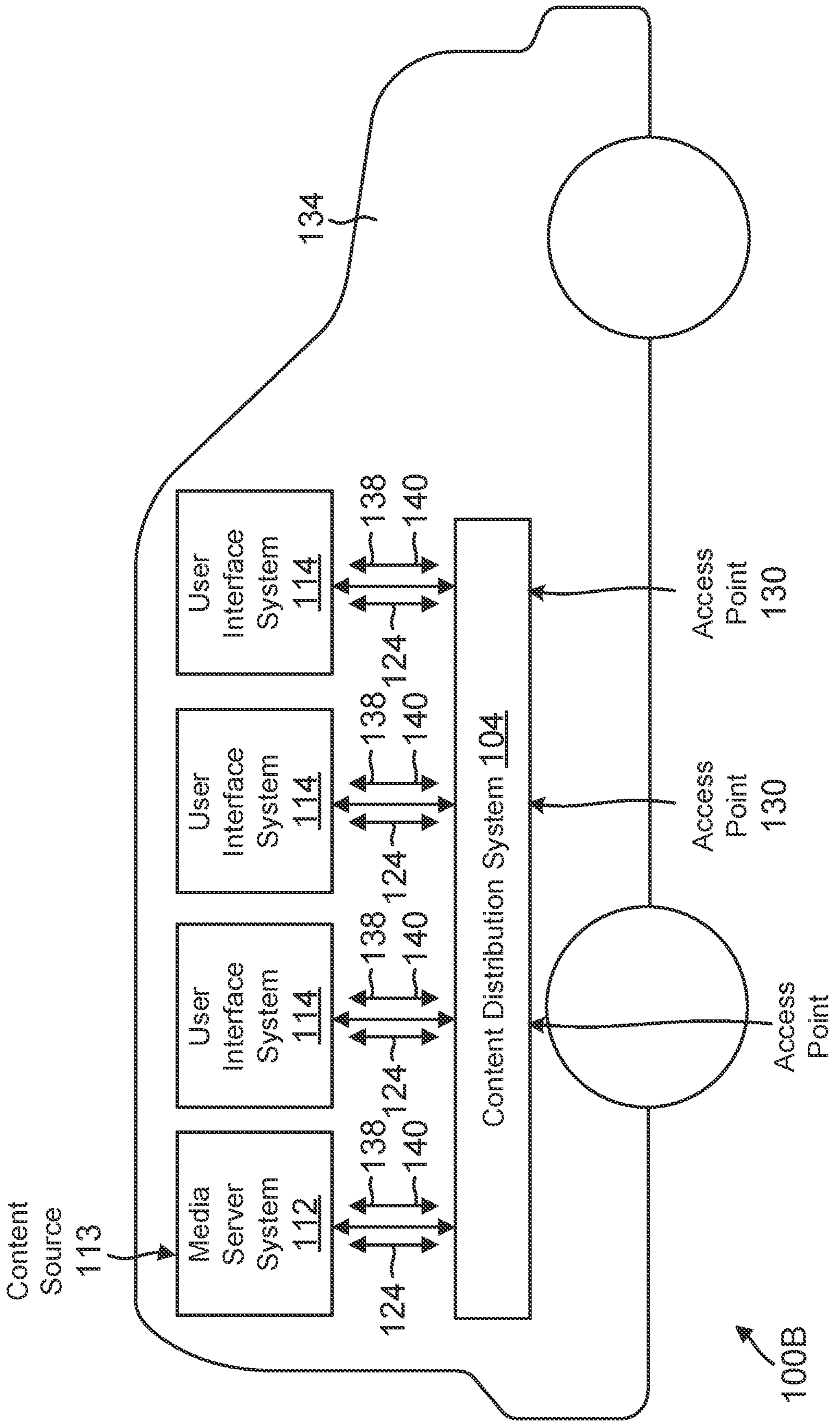
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2A:
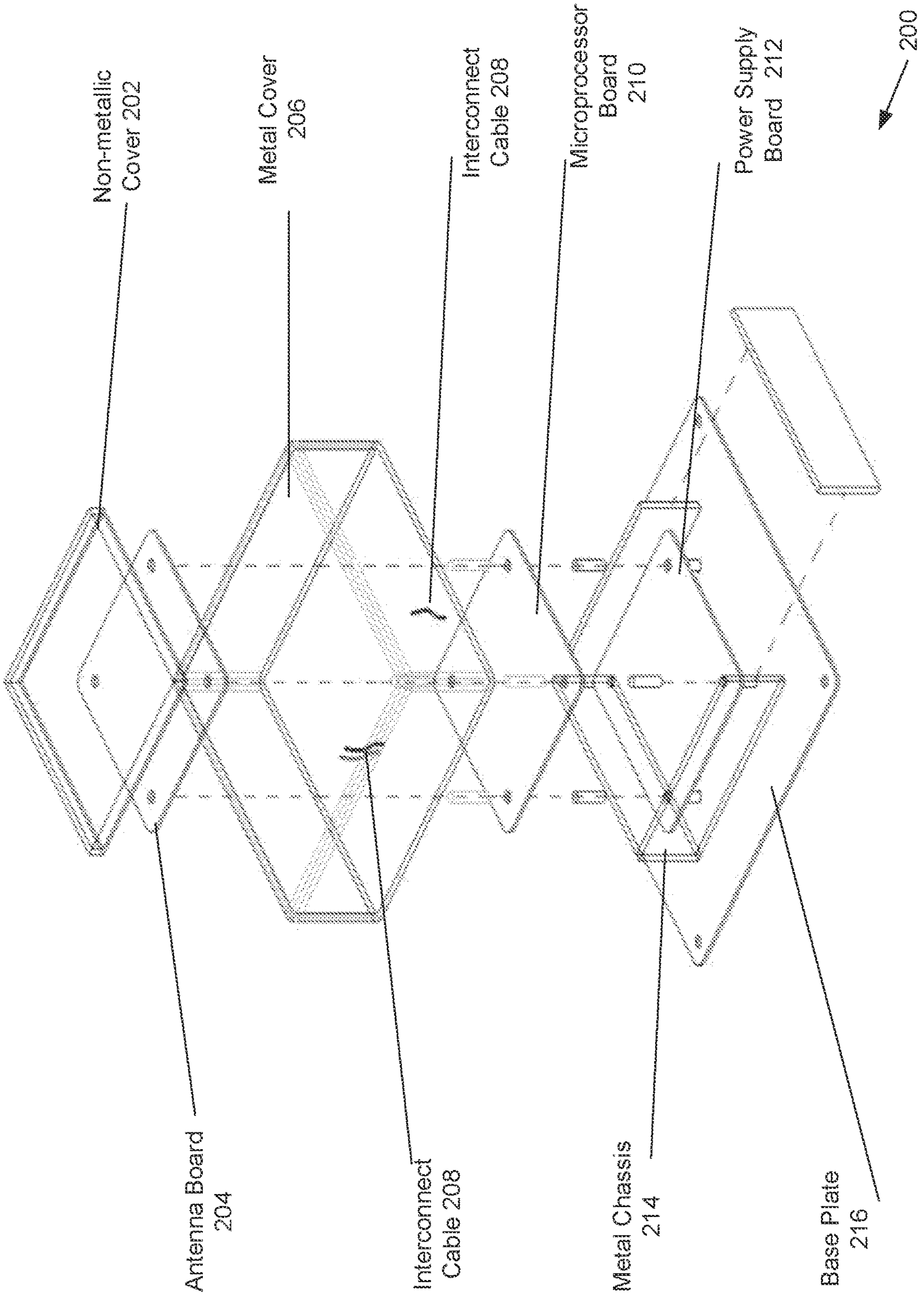
FIG. 2A (Prior Art)
FIG. 2A shows an exploded view of a conventional wireless access point (WAP) configuration for an aircraft.

Conventional WAP Configuration: Before describing the various innovative features of the present disclosure, the following describes the conventional configuration that is used, prior to the innovative configuration of FIGS. 3A-3D, described below in detail FIG. 2A shows an exploded view of a WAP assembly 200. The WAP assembly 200 includes a base plate 216 and a metal chassis 214 that is operationally connected to the metal chassis 214 using fasteners or other connecting mechanisms. A power supply board 212 is also coupled to the base plate 216 using fasteners or other similar mechanisms. A micro-processor board 210 is coupled above the power supply board and enclosed within a metal cover 206 that is connected to the base plate 214. An antenna board 204 is placed outside the metal cover and enclosed by a non-metallic cover 202, e.g., a plastic cover. The antenna board 204 is connected to the micro-processor board 210 using physical cables 208.

Figure 2B:
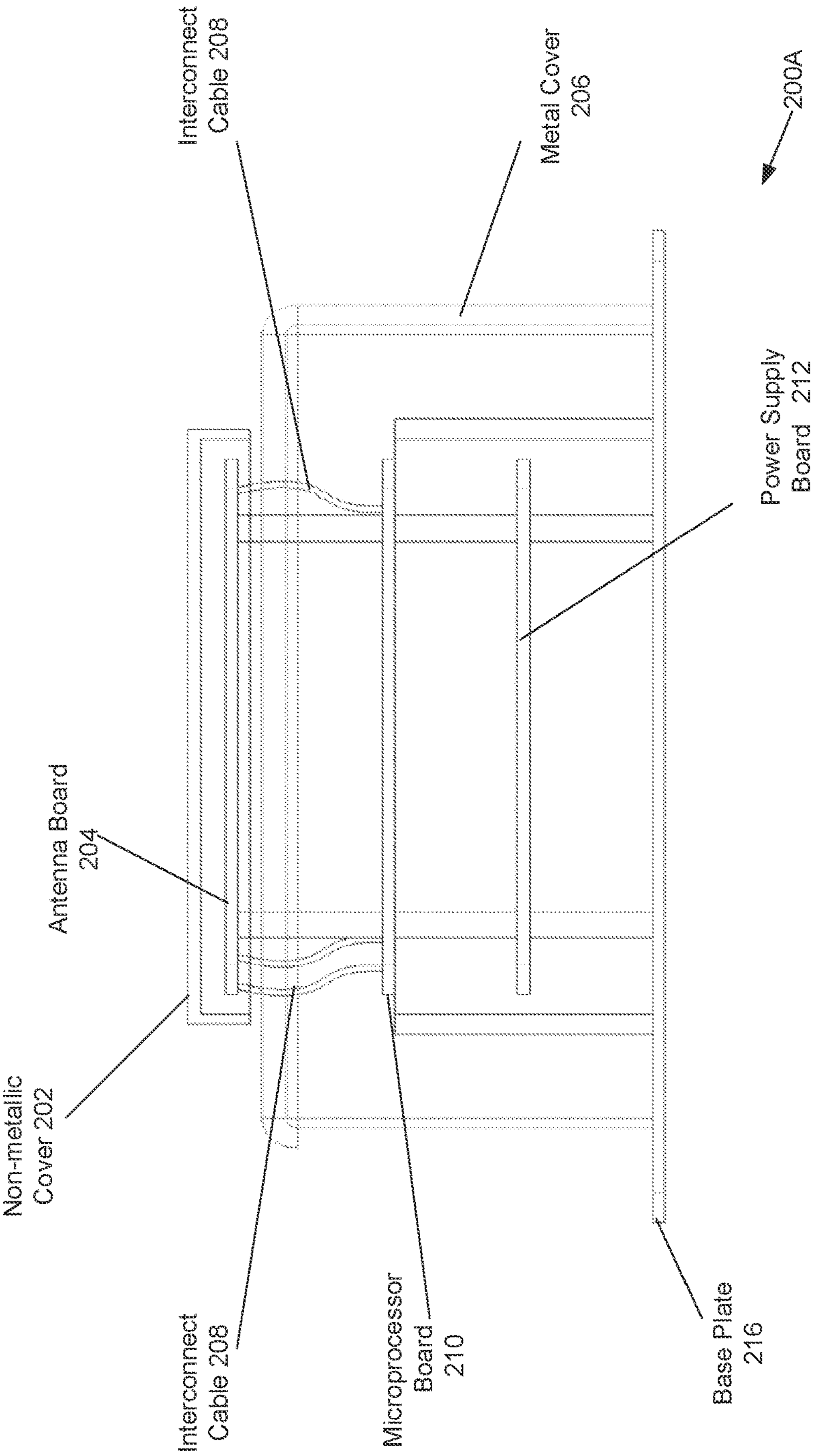
FIG. 2B (Prior Art)
FIG. 2B shows a sectional view of the conventional WAP configuration of FIG. 2A.
Figure 2C:
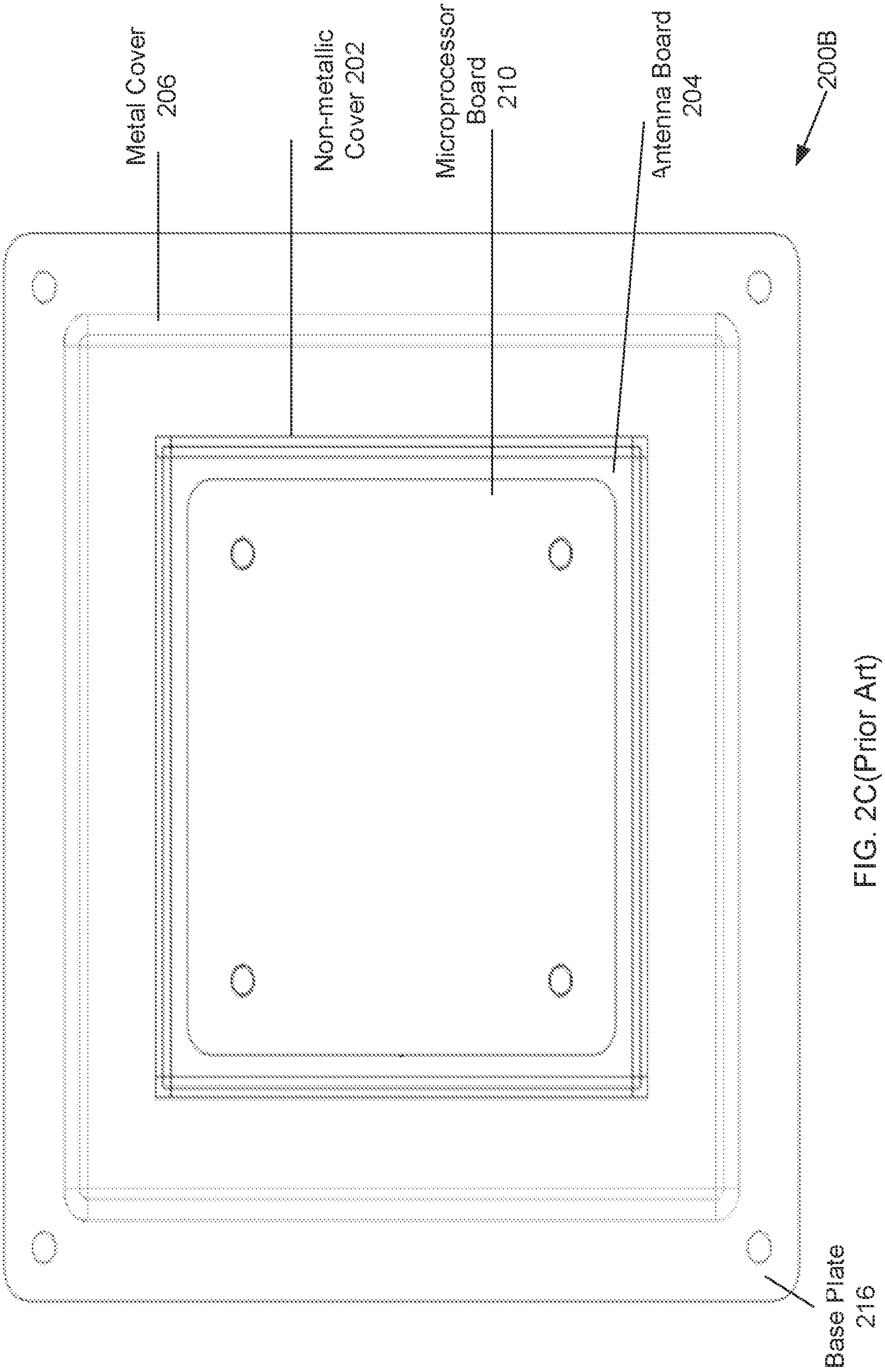
FIG. 2C(Prior Art)
FIG. 2C shows a top view of the conventional WAP configuration of FIG. 2A.

FIG. 2B shows a sectional view 200A of the WAP assembly 200. The sectional view shows the placement of the antenna board 204 outside the metal cover 206, interconnect cables 208 that physically connect the antenna board 204 with the micro-processor board 210. FIG. 2C shows a two-dimensional top view 200B of the WAP assembly 200.

The conventional design of WAP assembly 200 has limitations, e.g., the antenna board 204 is placed outside the metal cover 206 that adds height to the overall structure, which must meet stringent height requirements on an aircraft. Furthermore, the micro-processor board 210 and the antenna board 204 are connected by physical cables 208 and connectors through the metal cover 206, which makes the design complex and vulnerable to cable related damage. Separate boards 210 and 04 also increase the overall weight of the WAP assembly 200. The innovative new WAP design solves these limitations of WAP 200, as described below with respect to FIGS. 3A-3D and 4.

Figure 3A:
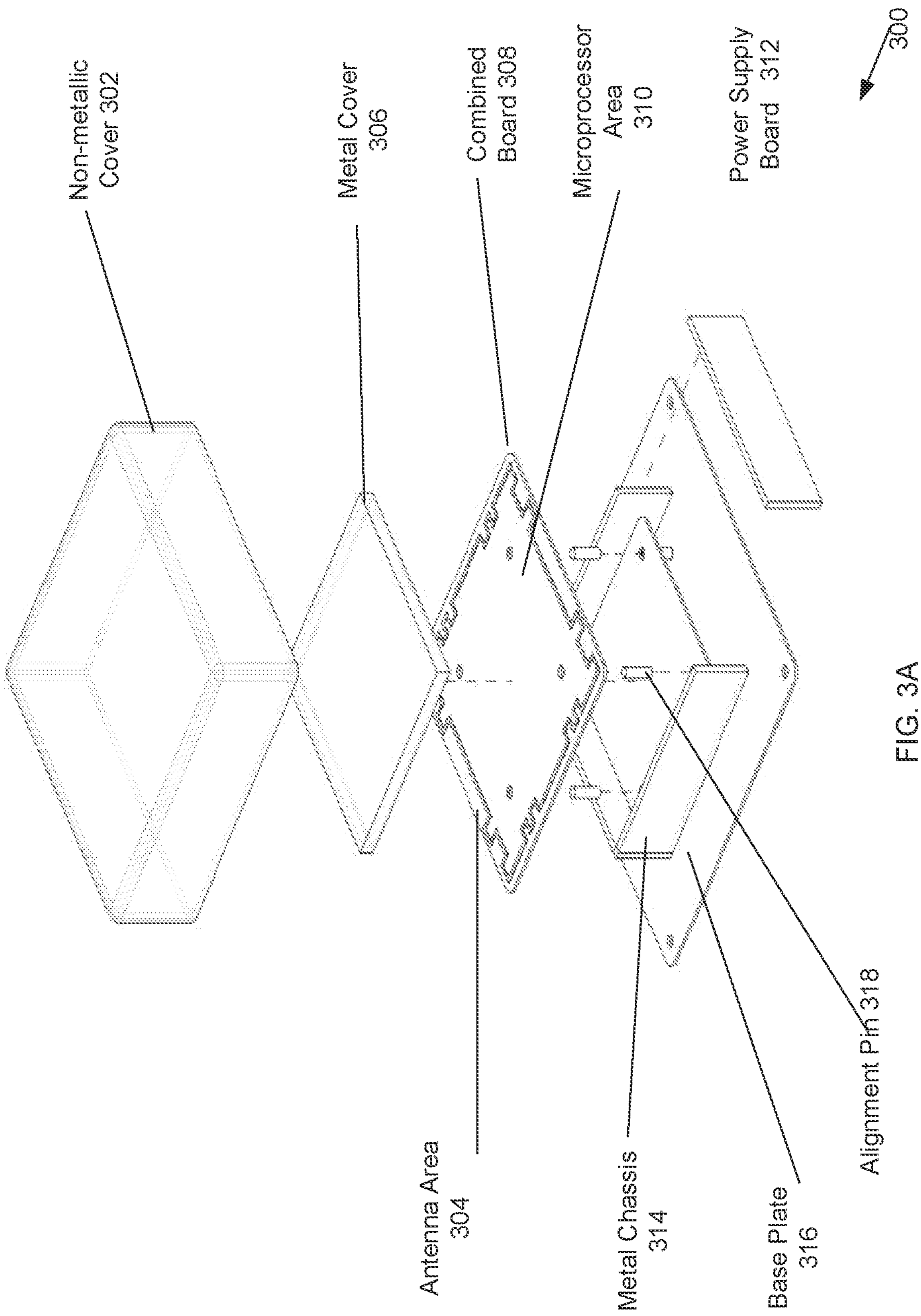
FIG. 3A shows an exploded view of A WAP configuration for an aircraft, according to one aspect of the present disclosure.

WAP Assembly 300: FIG. 3A shows an example of a WAP assembly 300, according to one aspect of the present disclosure. WAP assembly 300 includes a base plate 316. A metal chassis 314 is operationally coupled to the base plate 316. The power supply board 312 is placed within the metal chassis 314. A combined micro-processor and antenna board 308 (also referred to as "board 308") is placed above the power supply board 314 and aligned using alignment pins 318. Board 308 has a micro-processor area 310 (also referred to as area 310 or a first area 304) and an antenna area 304 (also referred to as area 304 or second area 304) that are co-planar. Area 310 is used to place micro-processor components (see FIG. 3D), while area 304 has antenna components (see FIG. 3D). In one aspect, area 304 is on the outside periphery of board 308.

To reduce or prevent electromagnetic interference, area 310 is covered by a metal cover 306 such that area 304 is located outside the metal cover 306. A non-metallic cover 302 is placed over the board 308 such that the antenna components in area 304 are protected. Furthermore, because area 304 and 310 are co-planar, no interconnect cables 208 (FIG. 2A) are used. As described below with respect to FIG. 3D.

Figure 3B:
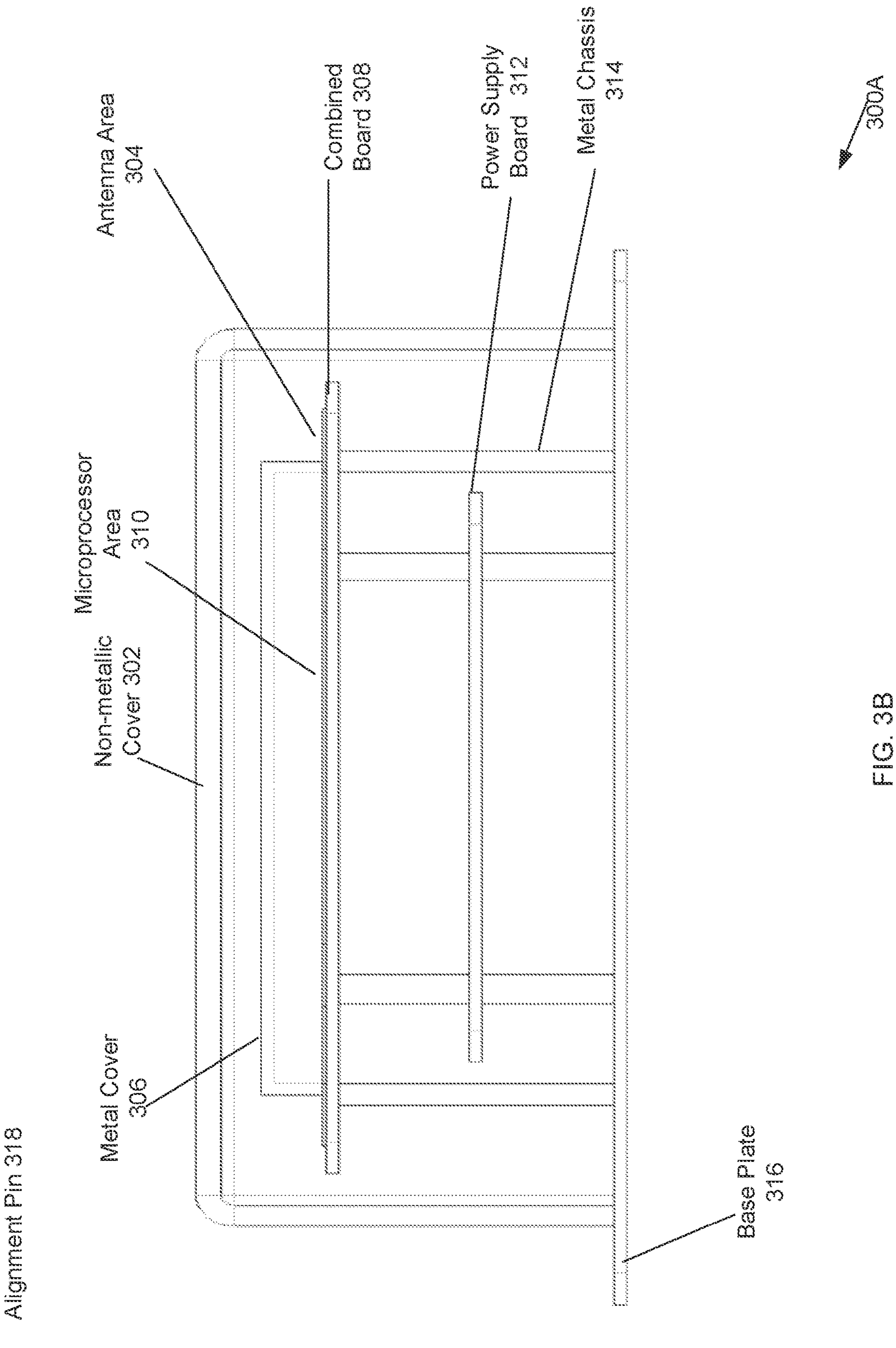
FIG. 3B shows a sectional view of the WAP configuration of FIG. 3A, according to one aspect of the present disclosure.

FIG. 3B shows a sectional view 300A of the WAP assembly 300, according to one aspect of the present disclosure. The sectional view shows the placement of board 308 with area 304 outside the metal cover 306 and area 310 within the metal cover 306. Non-metallic cover 302 is placed over the board 308 and coupled to the base plate 316.

It is noteworthy that although area 304 and 310 are located on the same surface of board 308, in another aspect, area 304 may be located on a top surface of board 308, while area 310 may be located at a bottom surface of board 308.

Figure 3C:
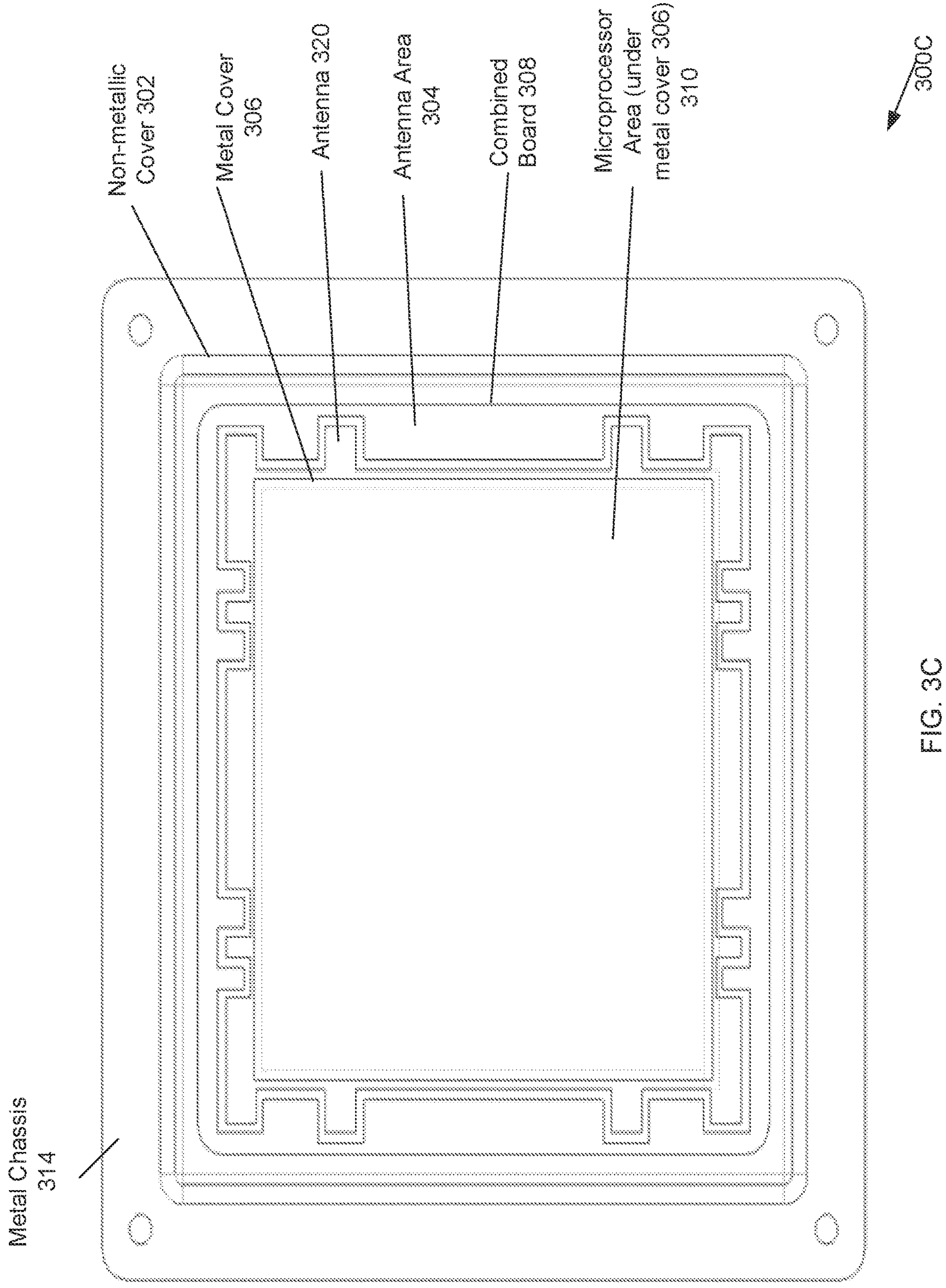
FIG. 3C shows a top view of the WAP configuration of FIG. 3A, according to one aspect of the present disclosure.

FIG. 3C shows a two-dimensional top view 300B of the WAP assembly 300. The various components of FIG. 3C have been described above with respect to FIG. 3A.

Figure 3D:
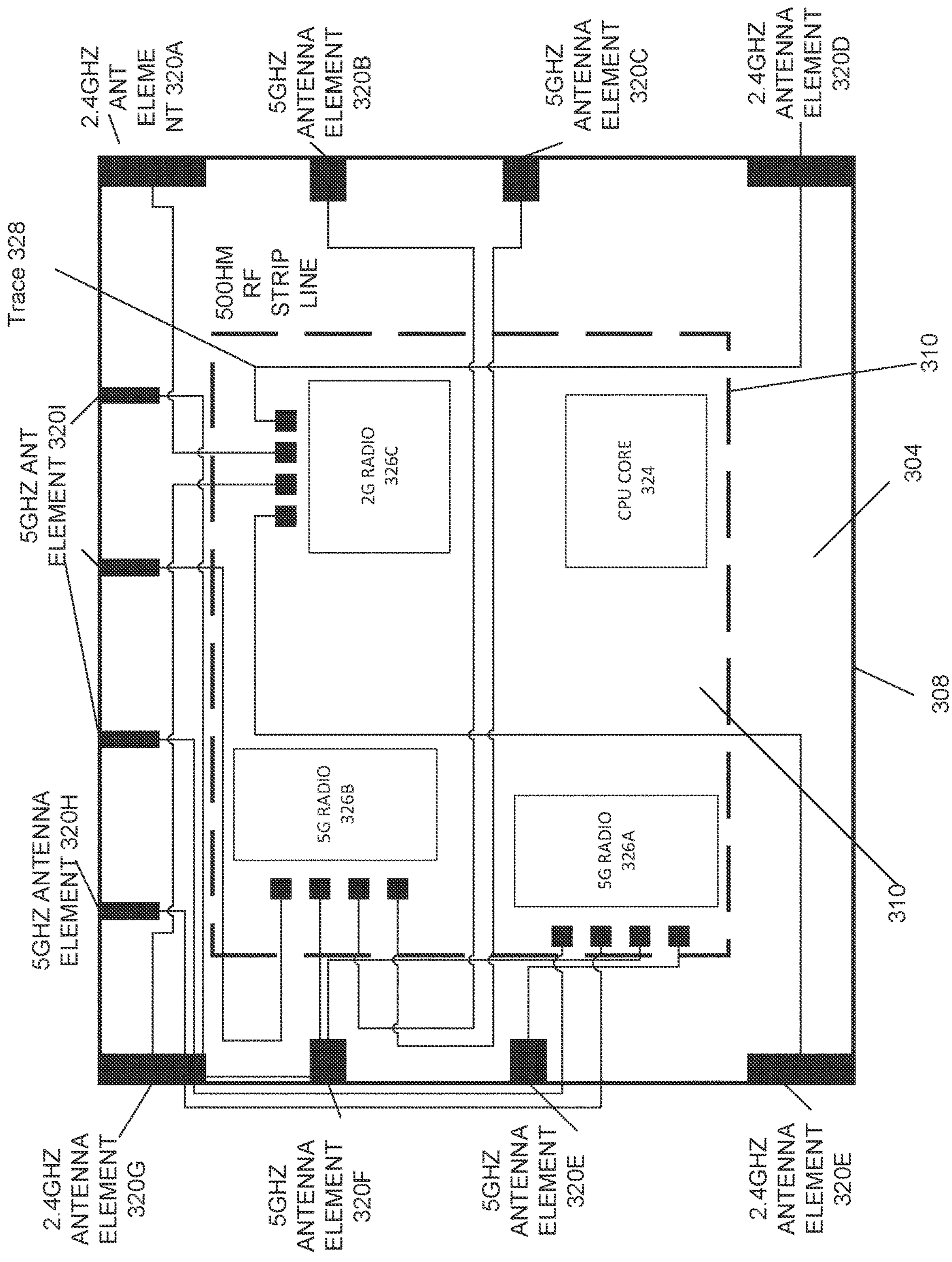
FIG. 3D shows a top view of a combined micro-processor and antenna board used in the WAP configuration of FIG. 3A, according to one aspect of the present disclosure.

FIG. 3D shows a top view of the board 308, where area 310 is within the metal cover 306 and area 304 is outside the metal cover 306. Area 310 includes a processing unit, shown as CPU core 324 and radio elements 326A-326C. The various antenna patch elements 320A-3201 are in area 304 and coupled to the radio elements 326A0326C using one or more traces 328. This eliminates the need for physical cables. Furthermore, because areas 304 and 310 are co-planar, it reduces the overall height of the WAP assembly 300 vis-à-vis WAP assembly 200 of FIG. 2A. This makes it easier to meet aircraft height restrictions and aviation form factors.

WAP assembly 300 has various advantages over WAP assembly 200. For example, by combining two separate boards into one (i.e., 308), reduces the overall weight of the assembly. This also reduces the overall height of the WAP assembly. The combined board 308 is also compact without physical cables and hence easier to replace and maintain.

In one aspect, a WAP (e.g., 300, FIG. 3A) is provided. The WAP includes a combined board (e.g., 308, FIG. 3A) having a first area (e.g., 310, FIG. 3A) with micro-processor components and a second area (e.g., 304, FIG. 3A) with antenna elements, the second area located at a periphery of the combined board. The WAP includes a metallic cover (e.g., 306, FIG. 3A) that is placed over the first area; and a non-metallic cover (e.g., 302, FIG. 3A) that is placed over the metallic cover and the second area.

The antenna elements are operationally connected to the micro-processor components using one or more traces (e.g., 328, FIG. 3D), without using external physical cables (e.g., 28, FIG. 2A).

In one aspect, the first area and the second area are co-planar on a same surface of the combined board 308. In another aspect, the first area is located on a first surface of the combined board and the second area is located on a second surface of the combined board, the first surface being vertically below the second surface. It is noteworthy that the WAP can be used on an aircraft or any other transportation vehicle.

In another aspect, a system is provided. The system includes a combined board (308) having a first area (310) with micro-processor components and a second area (304) for antenna elements; a metallic cover (306) that is placed over the first area; and a non-metallic cover (302) placed over the metallic cover and the second area. The second area may be located at a periphery of the combined board. The antenna elements are operationally connected to micro-processor components using one or more trace (328), without external physical cables (208).

In one aspect, the first area and the second area are co-planar on a same surface of the combined board. In another aspect, the first area is located on a first surface of the combined board and the second area is located on a second surface of the combined board; the first surface is vertically below the second surface. The system is for a WAP used on an aircraft or any other transportation vehicle.

Figure 4:
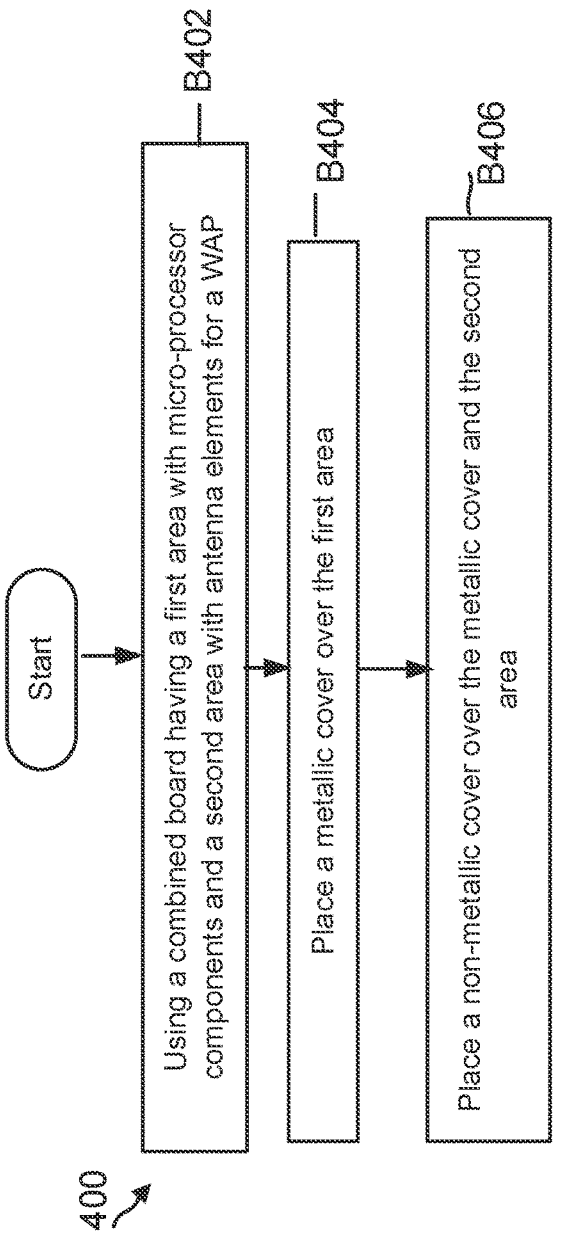
FIG. 4 shows a process flow, according to one aspect of the present disclosure.

Process Flow: FIG. 4 shows a process 400, according to one aspect of the present disclosure. Process 400 includes block B402, for using a combined board (308) having a first area (310) with micro-processor components and a second area (304) with antenna elements for a WAP (300), the second area located at a periphery of the combined board. In block B404, a metallic cover is placed over the first area. In block B404, a non-metallic cover 302 is placed over the metallic cover and the second area. The antenna elements are operationally connected to the micro-processor components using one or more traces, without using external physical cables.

Thus, methods and systems for WAP configuration on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A system, comprising:

a combined board having a first area with micro-processor components and a second area with antenna elements, wherein the first area and the second area are co-planar on a same surface of the combined board;

a metallic cover placed over the first area with the second area being located outside the metallic cover; and a non-metallic cover placed over the metallic cover over the first area and the second area.

2. The system of claim 1, wherein the second area is located at a periphery of the combined board.

3. The system of claim 1, wherein the antenna elements are operationally connected to the micro-processor components using one or more traces, without using external physical cables.

4. The system of claim 1, wherein the first area is located on a first surface of the combined board and the second area is located on a second surface of the combined board.

5. The system of claim 4, wherein the first surface is located below the second surface in a vertical plane.

6. The system of claim 1, wherein the system is for a wireless access point used on an aircraft.

7. The system of claim 1, wherein the system is for a wireless access point used on a transportation vehicle.

8. A wireless access point (WAP), comprising:

a combined board having a first area with micro-processor components and a second area with antenna elements, the second area located at a periphery of the combined board, wherein the first area and the second area are co-planar on a same surface of the combined board;

a metallic cover placed over the first area with the second area being located outside the metallic cover; and a non-metallic cover placed over the metallic cover over the first area and the second area.

9. The WAP of claim 8, wherein the antenna elements are operationally connected to the micro-processor components using one or more traces, without using external physical cables.

10. The WAP of claim 8, wherein the first area is located on a first surface of the combined board and the second area is located on a second surface of the combined board.

11. The WAP of claim 10, wherein the first surface is located vertically below the second surface.

12. The WAP of claim 8, wherein the WAP is used on an aircraft.

13. The WAP of claim 8, wherein the WAP is used on a transportation vehicle.

14. A method, comprising:

using a combined board having a first area with micro-processor components and a second area with antenna elements for a wireless access point (WAP), the second area located at a periphery of the combined board, wherein the first area and the second area are co-planar on a same surface of the combined board;

placing a metallic cover over the first area with the second area being located outside the metallic cover; and using a non-metallic cover that is placed over the metallic cover over the first area and the second area; wherein the antenna elements are operationally connected to the micro-processor components using one or more traces, without using external physical cables.

15. The method of claim 14, wherein the first area is located on a first surface of the combined board and the second area is located on a second surface of the combined board, the first surface being vertically below the second surface.

16. The method of claim 14, wherein the WAP is used on an aircraft.

17. The method of claim 14, wherein the WAP is used on a transportation vehicle.

* * * * *